US012719969B2

(12) United States Patent
Guebner et al.

(10) Patent No.: US 12,719,969 B2
(45) Date of Patent: Aug. 25, 2026

(54) METHOD FOR OPERATING UNITS OF A COMMUNICATION SYSTEM

(71) Applicant: Robert Bosch GmbH, Stuttgart (DE)

(72) Inventors: Sascha Guebner, Bodenburg (DE); Johannes Morgenroth, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 45 days.

(21) Appl. No.: 18/716,963

(22) PCT Filed: Dec. 7, 2022

(86) PCT No.: PCT/EP2022/084846
§ 371 (c)(1),
(2) Date: Jun. 6, 2024

(87) PCT Pub. No.: WO2023/110591
PCT Pub. Date: Jun. 22, 2023

(65) Prior Publication Data

US 2025/0047766 A1 Feb. 6, 2025

(30) Foreign Application Priority Data

Dec. 17, 2021 (DE) ..................... 10 2021 214 627.9

(51) Int. Cl.
*H04L 69/28* (2022.01)
*H04L 43/0852* (2022.01)
*H04W 4/46* (2018.01)

(52) U.S. Cl.
CPC .......... *H04L 69/28* (2013.01); *H04L 43/0852* (2013.01)

(58) Field of Classification Search
CPC ....... H04L 69/28; H04L 43/0852; H04W 4/46
See application file for complete search history.

(56) References Cited

U.S. PATENT DOCUMENTS

2005/0159835 A1* 7/2005 Yamada ................. G06Q 10/06 700/109
2014/0192797 A1* 7/2014 Licardie ................ H04J 3/0658 370/350

(Continued)

FOREIGN PATENT DOCUMENTS

DE 102016213992 A1 2/2018
DE 102019208038 A1 12/2020

OTHER PUBLICATIONS

International Search Report for PCT/EP2022/084846, Issued Mar. 28, 2023.

(Continued)

*Primary Examiner* — Kamal M Hossain
(74) *Attorney, Agent, or Firm* — NORTON ROSE FULBRIGHT US LLP

(57) ABSTRACT

A method for operating a first communication unit of a communication system to determine, using a second communication unit, a maximum value for a latency time of a data packet transmitted from a first communication unit to a second communication unit of the communication system. The method includes: receiving, using the first communication unit, at least one token message sent from the second communication unit to the first communication unit and including time information representing a reference time of the token message; and sending, by the first communication unit, the data packet with the time information included in the at least one received token message to the second communication unit to determine the maximum value for the latency time of the data packet transmitted from the first communication unit to the second communication unit on the basis of the time information comprised by the data packet.

14 Claims, 5 Drawing Sheets

(56) References Cited

U.S. PATENT DOCUMENTS

| | | | | |
|---|---|---|---|---|
| 2021/0203578 | A1* | 7/2021 | Li | H04L 5/0055 |
| 2023/0093388 | A1* | 3/2023 | Robitaille | H04L 43/106<br>370/252 |
| 2024/0039861 | A1* | 2/2024 | Mazurek | H04L 43/0864 |

OTHER PUBLICATIONS

Mills, "Network Time Protocol (Version 3) Specification, Implementation and Analysis," Network Working Group, 1992, pp. 1-96. <https://dl.acm.org/doi/pdf/10.17487/RFC1305> Downloaded Jun. 5, 2024.

* cited by examiner 100
200
300
receive token message(s)
110
send data packet
120
send token message(s)
210
receive data packet
220
determine maximum value for latency time
230
send token message(s)
310
receive token message(s)
320
send data packet
330
receive data packet
340
determine maximum value for latency time
350

METHOD FOR OPERATING UNITS OF A COMMUNICATION SYSTEM

FIELD

The present invention relates to a method for operating a first communication unit of a communication system, a corresponding method for operating a second communication unit of the communication system, and a method for operating a communication system. The present invention also relates to a first communication unit, a second communication unit and a communication system. The present invention also relates to a computer program and a machine-readable storage medium on which the computer program is stored.

BACKGROUND INFORMATION

In many deployment scenarios in distributed systems, an estimation of the communication latency between two or more communication partners is important. For example, in various safety-critical systems, the communication latency may not exceed a certain threshold in order to still ensure the currency of the data. For such systems, the precise estimation of the communication latency is of secondary importance since, from a safety perspective, only the worst-case latency or the maximum age of the data is decisive.

In conventional methods, the communication latency is determined by means of time synchronization of the communication participants and time stamps in the messages. This can be done in different ways, e.g., by synchronizing all participants to an external time signal (GPS, or a time signal transmitter), or by means of a bidirectional exchange of time synchronization messages and an estimation of the average latency (network time protocol, precision time protocol).

Common to these two approaches is that they require clocks on the part of all communication participants, which clocks are synchronized by the methods, i.e., brought to a common time basis. The data transmitter provides its messages with a timestamp of its current system time. The recipient of the message then determines the difference between its system time and the accompanying timestamp to determine the communication latency.

SUMMARY

According to a first aspect, an object of the present invention is to provide a method for operating a first communication unit of a communication system in order to determine, by means of a second communication unit, a maximum value of a latency time of a data packet transmitted from the first communication unit to the second communication unit of the communication system.

According to a second aspect, an object of the present invention is to provide a method for operating a second communication unit of a communication system in order to determine, by means of the second communication unit, a maximum value of a latency time of a data packet transmitted from a first communication unit of the communication system to the second communication unit.

According to a third aspect, an object of the present invention is to provide a method for operating a communication system comprising a first communication unit and a second communication unit in order to determine, by means of the second communication unit, a maximum value of a latency time of a data packet transmitted from the first communication unit to the second communication unit.

According to a fourth aspect, an object of the present invention is to provide a first communication unit.

According to a fifth aspect, an object of the present invention is to provide a second communication unit.

According to a sixth aspect, an object of the present invention is to provide a communication system, comprising a first communication unit according to the fifth aspect and a second communication unit according to the sixth aspect.

According to an additional aspect, an object of the present invention is to provide a computer program or a plurality of computer programs, as well as a machine-readable storage.

In the context of the present invention, a communication unit can be understood to be a unit that is designed to receive and send messages or data packets transmitted wirelessly or by wire.

In particular, a communication unit comprises at least one processor, at least one storage medium comprising computer program code, and at least one communication interface. The computer program code is configured to work with the at least one processor and the at least one communication interface so as to cause the communication unit to operate in accordance with the method according to the first and/or second aspect of the present invention. The communication interface can be a software and/or hardware interface that is designed to receive and/or send data packets or messages wirelessly or by wire.

That is, in other words, the communication unit is designed for wireless and/or wired communication. The wireless communication can, for example, include radio communication, in particular mobile radio and/or WLAN and/or near-field communication. Wired communication can, for example, be communication via a bus system such as CAN/FD, Flexray or Ethernet.

Each of the communication units can be part of a mobile or stationary device. It is possible that one of the communication units, in particular the first communication unit, is arranged on a mobile device, for example on a vehicle. It is also possible that one of the communication units, in particular the second communication unit, is arranged apart from a mobile device and is, for example, part of a cloud computing system or a server backend.

Preferably, the first communication unit can be connected directly or indirectly to a sensor unit, in particular arranged on a vehicle, in order to receive sensor data generated by the sensor unit. For example, the first communication unit can be designed as a connectivity unit, in particular of a vehicle, which preferably can be or is connected wirelessly or by wire to one or more control units of the vehicle designed as data-provision units.

The first and the second communication unit can be connected or connectable to one another by means of one or more communication connections or communication paths. In this case, a communication connection or a communication path can be designed as a wireless or wired communication connection or as a wireless or wired communication path. It is also possible that the communication connection or the communication path between the first and the second communication unit comprises at least two successive communication sections, wherein a first communication section is designed as a wireless communication connection, and a second communication section is designed as a wired communication connection.

According to an example embodiment of the present invention, the method for operating the first communication unit comprises a step of receiving at least one token message sent from the second communication unit to the first communication unit, by means of the first communication unit, in particular a communication interface thereof. The token message comprises time information that represents a reference time of the token message. The token message can, for example, be in the form of a data packet transmitted wirelessly or by wire.

The reference time of the token message is a time associated with the token message or a point in time associated with the token message. The reference time can, for example, be a time or a point in time of generation or of, in particular expected, transmission of the token message. Preferably, the reference time of the token message is determined by means of the second communication unit. The reference time can correspond to a current time of a clock associated with the second communication unit or comprised by the second communication unit, or to a system time of the second communication unit at a point in time of generation or of, in particular expected, transmission of the token message.

The time information is information that is comprised by the token message and that represents the reference time of the token message. It is possible that the time information comprises the reference time or consists of the reference time. For example, the time information can comprise a time stamp or be designed as a time stamp. The reference time, in particular the time stamp, can be comprised by the time information in encrypted or unencrypted form. It is also possible that the time information represents the reference time, in particular the time stamp, by means of a number and/or letter code associated with the reference time, in particular counter information associated with the reference time. This has the advantage that the first communication unit, as a potential attacker, cannot draw any conclusions about the reference time in the second communication unit. This makes it difficult for an attacker to modify the reference time. This can, for example, prevent the value of the reference time from being increased by an attacker in order to simulate a lower latency.

According to an example embodiment of the present invention, the method for operating the first communication unit can comprise a step of storing the time information by means of a storage medium associated with the first communication unit or comprised by the first communication unit. The method can also include a step of replacing stored time information with last received and/or more recent time information. The method can furthermore comprise a step of copying or adding the received and/or stored time information to the data packet to be sent. In this context, the time information is stored and/or added and/or copied in particular unchanged or without modification. It is also possible that the received time information is stored and/or added to the data packet in an adapted form determined by means of the first communication unit using a specified or specifiable adaptation rule, wherein the adapted time information is converted into the time information by means of the second communication unit using a specified or specifiable reverse adaptation rule.

According to an example embodiment of the present invention, the method for operating the first communication unit further comprises a step of sending, by means of the first communication unit, the data packet with the time information comprised by the at least one received token message to the second communication unit in order to determine, by means of the second communication unit, the maximum value for the latency time of the data packet transmitted from the first communication unit to the second communication unit on the basis of the time information comprised by the data packet. Preferably, a plurality of data packets are sent spaced apart in time, in particular periodically, by means of the first communication unit to the second communication unit. In this context, the data packets each comprise time information comprised by a received token message of the second communication unit.

The data packet is transmitted from the first communication unit to the second communication unit by means of a communication connection. The data packet comprises the time information, in particular in a manner unchanged from the token message with regard to content and/or format, and preferably useful data. The useful data can comprise sensor data, e.g., audio and/or video data, in particular provided directly or indirectly by a sensor unit to the first communication unit. Based on the time information comprised by the data packet, the maximum value for the latency time of the data packet can be determined by means of the second communication unit in accordance with the maximum value for the latency time of the useful data.

The latency time of the data packet is a time that is required to transmit the data packet from the first communication unit to the second communication unit. In particular, the latency time of the data packet is a time or a period of time that is required to transmit useful data by means of the data packet from the first communication unit to the second communication unit. The latency times of two data packets sent consecutively in time can be different depending on one or more states and/or properties of the communication system.

In the context of the present invention, a maximum value for a latency time of a data packet can be understood as a temporal value or a time specification which is greater than or equal to, in particular truly greater than, a maximum possible latency time of the data packet in the communication system. The maximum value for the latency time preferably represents an estimate of the latency time that can be determined by means of the second communication unit—even if it is not possible to determine the actual latency time of the data packet by means of the second communication unit—wherein the actual latency time of the data packet is less than or equal to the maximum value of the latency time. That is, in other words, the maximum value for the latency time can be configured as an upper restrictive value for the latency time, which is not exceeded by the latency time. Therefore, the maximum value also takes into account a latency time for a worst-case scenario with regard to latency time during a transmission of the data packet.

According to an example embodiment of the present invention, the method for operating the second communication unit comprises a step of sending at least one token message by means of the second communication unit to the first communication unit. The token message comprises time information that represents a reference time of the token message.

According to an example embodiment of the present invention, the method according to the second aspect furthermore comprises a step of receiving, by means of the second communication unit, the data packet transmitted from the first communication unit to the second communication unit. The data packet comprises the time information comprised by the at least one sent token message.

According to an example embodiment of the present invention, the method according to the second aspect furthermore comprises a step of determining, by means of the second communication unit, the maximum value for the latency time of the data packet transmitted from the first communication unit to the second communication unit. In this context, the maximum value for the latency time is determined or calculated based on the time information comprised by the data packet.

By means of the methods according to the present invention and the communication units according to the present invention, it is now possible to determine a maximum value for the latency of a data packet in a communication system in a technically simple and at the same time particularly reliable manner, wherein the actual latency of the data packet is less than or equal to the maximum value. The maximum value for the latency can be determined by means of the communication unit receiving the data packet, regardless of the presence of a clock or a system time on the part of the communication unit sending the data packet. In particular, no synchronization of clocks or system times between the communication units is required. This can reduce the technical complexity of the communication unit sending the data packet, and complex time synchronization procedures can be omitted. The proposed approach is particularly advantageous for security and/or safety-relevant applications such as the teleoperated driving of a vehicle in which the trustworthiness of the contents of the data packet is particularly relevant, and exceeding a threshold value for the latency time of a data packet requires a transference of the system, e.g. the vehicle, to a safe state. In particular, the proposed approach enables a simplification of a safety analysis of the communication system and of an application realized by means of the communication system.

According to an example embodiment of the present invention, it is advantageous if the method according to the first aspect comprises a step of receiving, by means of the first communication unit, an additional token message sent from the second communication unit to the first communication unit, in particular spaced apart in time from the sent token message. The additional token message comprises time information which represents a reference time of the additional token message. In this case, the transmitted data packet comprises the time information comprised by the last token message received by the first communication unit. Alternatively, the transmitted data packet comprises the time information that is comprised by the received token messages and that represents the most recent or newest reference time. For this purpose, the time information comprised by the received token messages is stored by means of the first communication unit.

This design can reduce the deviation of the maximum value from the actual latency time. This can reduce false positive cases in which the determined maximum value for the latency time exceeds a specified or specifiable threshold value without the actual latency time exceeding the threshold value.

According to an example embodiment of the present invention, it is advantageous here if the token message and the additional token message each comprise counter information, wherein the time information representing the most recent reference time is selected based on the counter information. In particular, the counter information is comprised by the time information. It is also possible that the time information is designed as counter information or that the time information consists of the counter information.

The counter information can, for example, comprise or be configured as a number, e.g. a sequence number, associated with the token message. The counter information of token messages sent consecutively in time can increase monotonically within a specified or specifiable range of values.

That is, in other words, for increased availability of the methods, it is advantageous if the first communication unit adds the most recent time information, e.g., represented by a highest time stamp received to date, to the data packet in order to prevent outdated time information, e.g., an outdated time stamp, from being added to the data packet when token messages are reordered on a communication channel from the second to the first communication unit, which would cause the data packet to be incorrectly classified as too old. In the case of encrypted time information, either an encryption method that preserves a monotony of the reference time, or monotonically increasing counter information that is transmitted in unencrypted form can be used.

By means of this embodiment of the present invention, the time information to be added to the data packet can be correctly selected, and/or resources for transmitting the time information can be reduced, by means of the first communication unit, even in the case of encrypted time information.

According to an example embodiment of the present invention, the method according to the first and/or second aspect can comprise corresponding steps for one or more additional first communication units. In this case, in particular the same at least one token message is received by means of the additional first communication unit and an additional data packet with the time information comprised by the at least one received token message is sent to the second communication unit by means of the additional first communication unit in order to determine, by means of the second communication unit, the maximum value for the latency time of the additional data packet transmitted from the additional first communication unit to the second communication unit based on the time information comprised by the additional data packet. The token message can be sent to the first and the one or more additional first communication units using a broadcast or unicast method.

According to an example embodiment of the present invention, the method according to the first and/or second aspect can comprise corresponding steps for one or more additional second communication units. In this case, token messages are sent by the second communication units, and a data packet with the time information comprised by the particular received token message is sent by means of the first communication unit to the particular second communication unit in order to determine, by means of the particular second communication unit, the maximum value for the latency time of the data packet transmitted from the first communication unit to the particular second communication unit based on the time information comprised by the particular data packet.

According to an example embodiment, it is advantageous if, in the method according to the second aspect of the present invention, the maximum value for the latency time is furthermore determined based on a reception time of the data packet received by means of the second communication unit. Preferably, the maximum value for the latency time is determined as the difference between the reception time and the reference time represented by the time information. It is possible that the method comprises a step of decrypting encrypted transmitted time information and/or assigning the corresponding reference time to the transmitted time information in order to determine the maximum value. This design allows the maximum value to be determined particularly quickly.

According to an example embodiment of the present invention, it is also advantageous if token messages, each comprising time information representing a reference time of the particular token message, are sent spaced apart in time, in particular periodically, to the first communication unit by means of the second communication unit. In other words, the token messages sent spaced apart in time, in particular periodically, each comprise time information, wherein the time information represents a reference time of the particular token message. The temporal spacing and/or the periodicity can be specified or specifiable as a static value, or can be determined during the runtime of the method. By sending the token messages with a smaller temporal spacing, a deviation of the maximum value from the actual latency time can be reduced. This can reduce false positive cases in which the determined maximum value for the latency time exceeds a specified or specifiable threshold value without the actual latency time exceeding the threshold value. By sending the token messages with greater temporal spacings, resources for transmitting the token messages can be reduced.

According to an example embodiment of the present invention, it is further advantageous in this case if a temporal spacing, in particular a periodicity, of the token messages sent spaced apart in time, in particular periodically, is determined or specified depending on at least one, in particular all, of the following variables:

- fault-tolerant time interval,
- probability of exceeding the fault-tolerant time interval,
- loss probability for the loss of token messages and/or data packets,
- transmission period of the token message,
- transmission period of the data packet,
- temporal spacing or periodicity of the data packets.

It is possible for a temporal spacing $I_{Token}$ between two token messages sent consecutively in time to be determined according to the inequations $$I_{Token} < (FTTI - RTT - I_{Data})/(n+1)$$

and $$P_{loss}{}^{n+1} < P_{fail}$$

In this case, FTTI (fault tolerant time interval) refers to a specified or specifiable fault-tolerant time interval, in particular a maximum permissible time interval between detecting an occurrence of an error by means of the first communication unit and receiving a data packet communicating the occurrence of the error by means of the second communication unit. RTT (round trip time) denotes a sum of a transmission period of a token message from the second to the first communication unit and a transmission period of a data packet from the first to the second communication unit. $I_{Data}$ denotes a temporal spacing between two data packets sent consecutively in time by means of the first communication unit. n denotes a maximum permissible number of token messages sent consecutively in time that are not successfully transmitted to the first communication unit. $P_{loss}$ denotes a loss probability for a loss of token messages and/or data packets during the transmission. $P_{fail}$ denotes a specified or specifiable probability of exceeding the FTTI.

In this case, it is possible that the temporal spacing $I_{Data}$ between two data packets sent consecutively in time is determined according to the inequalities $$I_{Data} < (FTTI - T_{Data})/(m+1)$$

and

-continued $$P_{loss}{}^{m+1} < P_{fail}$$

In this case, $I_{Data}$ denotes a latency time or transmission period of a data packet from the first to the second communication unit. m denotes a maximum permissible number of data packets sent consecutively in time that are not successfully transmitted to the second communication unit.

Based on the temporal spacing $I_{Token}$ between two token messages sent consecutively in time, a periodicity of the token messages can be determined as $1/I_{Token}$.

This embodiment of the present invention provides a parameterization for the temporal spacing or periodicity of the token messages, by means of which the requirements of an application on which the method is based as well as properties of the communication connection between the communication units can be taken into account.

According to an example embodiment of the present invention, it is advantageous in this case if the temporal spacing of the token messages sent spaced apart in time, in particular a periodicity of token messages sent periodically, is determined or adjusted using an extrapolation algorithm, in particular an extrapolation algorithm based on a linear average, and a smoothing algorithm, in particular an exponential smoothing algorithm.

It is possible for an extrapolation value $I_{Token,\ Ex}$ for the temporal spacing to be determined according to $$I_{Token,Ex} = \mathrm{Min}(I_{Token}) - (1-q) * [\mathrm{Max}(I_{Token}) - \mathrm{Min}(I_{Token})]$$

In this case, $\mathrm{Max}(I_{Token})$ and $\mathrm{Min}(I_{Token})$ denote specified or specifiable maximum and minimum values, wherein $\mathrm{Max}(I_{Token})$ preferably corresponds to the fault-tolerant time interval. q denotes a quotient of the current or last determined maximum value for the latency time and the fault-tolerant time interval.

Based on this extrapolation value $I_{Token,\ Ex}$ for the temporal spacing, an adjusted temporal spacing $I_{Token,\ New}$ can be iteratively smoothed according to $$I_{Token,New,t+1} = (1-\alpha) * I_{Token,New,t+1} + \alpha * I_{Token,Ex,t+1}$$

to avoid strong fluctuations caused by individual outliers. In this case, $\alpha$, with $\alpha$ preferably less than or equal to 0.5, denotes a specified or specifiable weighting factor or smoothing factor. t denotes an iteration step. With these embodiments, the temporal spacing can be determined or adjusted dynamically during the runtime of the method.

According to an example embodiment of the present invention, it is also advantageous if the token message comprises counter-. information, in particular comprised by the time information, wherein preferably a number of bits representing the counter information is determined or specified depending on at least one, in particular all, of the following variables:

- temporal spacing or periodicity of the token messages,
- temporal spacing or periodicity of the data packets,
- maximum possible latency time of a data packet received by the second communication unit.

Preferably, the time information in this case consists of the counter information.

According to an example embodiment of the present invention, in order to achieve uniqueness of token messages, the number of bits representing the counter information must be dimensioned such that only half of the number space is used unconfirmed. This means that, with a number space from 0 to 3 corresponding to 2 bits, only the token messages with the counter information 0 and 1 are sent by means of the second communication unit until a data packet with the time reference 0 or 1 is received by means of the second communication unit. If a data packet with the time reference 0 or 1 is received by means of the second communication unit, a token message with the counter information 2 can be sent by means of the second communication unit, and so on.

From this mechanism, it follows that the number of bits representing the counter information or the size of the number space for the token messages has an influence on the availability of the communication system. In order to achieve sufficient performance, the maximum possible latency time of a data packet received by the second communication unit or a maximum dwell time of the data packet in a communication network connecting the first and the second communication unit is preferably taken into account. This allows the number of bits representing the counter information or the size of the number space for the token messages to be selected in such a way that a delayed data packet is not mistakenly considered to be current by the second communication unit.

The size of the number space N can be determined, for example, according to the inequation:

$$N > 2 * \left[T_{max}/\min(I_{Data}, I_{Token}) - 1\right]$$

In this case, $I_{Token}$ denotes the temporal spacing between token messages sent consecutively in time, $I_{Data}$ denotes the temporal spacing between data packets sent consecutively in time, and $T_{max}$ denotes a maximum latency time of a data packet received by means of the second communication unit. The number of bits representing the counter information can be determined according to:

$$B = \lceil \mathrm{Log}_2 N \rceil$$

using a rounding function [ . . . ]. This design allows the resources for communicating the time information to be minimized in order to also use the methods in a communication system with a small amount of useful data, such as CAN.

According to an example embodiment of the present invention, it is further advantageous if the method according to the second aspect comprises a step of sending an error message to the first communication unit if the determined maximum value for the latency time is greater than or equal to a specified or specifiable threshold value. In response to the sent error message, the first communication unit and/or a mobile device comprising the first communication unit, e.g. a vehicle, can be controlled to switch the mobile device to a specified or specifiable state. This can prevent critical operating situations caused by a delay in the transmission of data packets, for example during teleoperated driving of a vehicle.

A computer program product or a computer program comprising program code that can be stored on a machine-readable carrier or storage medium, such as a semiconductor memory, a hard disk memory, or an optical memory, and that is used for carrying out, implementing, and/or actuating the steps of one or more methods according to one of the embodiments of the present invention described above is also advantageous, in particular when the program product or program is executed on a computer or on one or more communication units.

The present invention is explained in more detail below with reference to the figures.

DETAILED DESCRIPTION OF EXAMPLE EMBODIMENTS

In the following description of preferred exemplary embodiments of the present invention, the same or similar reference signs are used for the elements shown in the various figures and acting similarly, as a result of which a repeated description of the elements is omitted.

Figure 1:
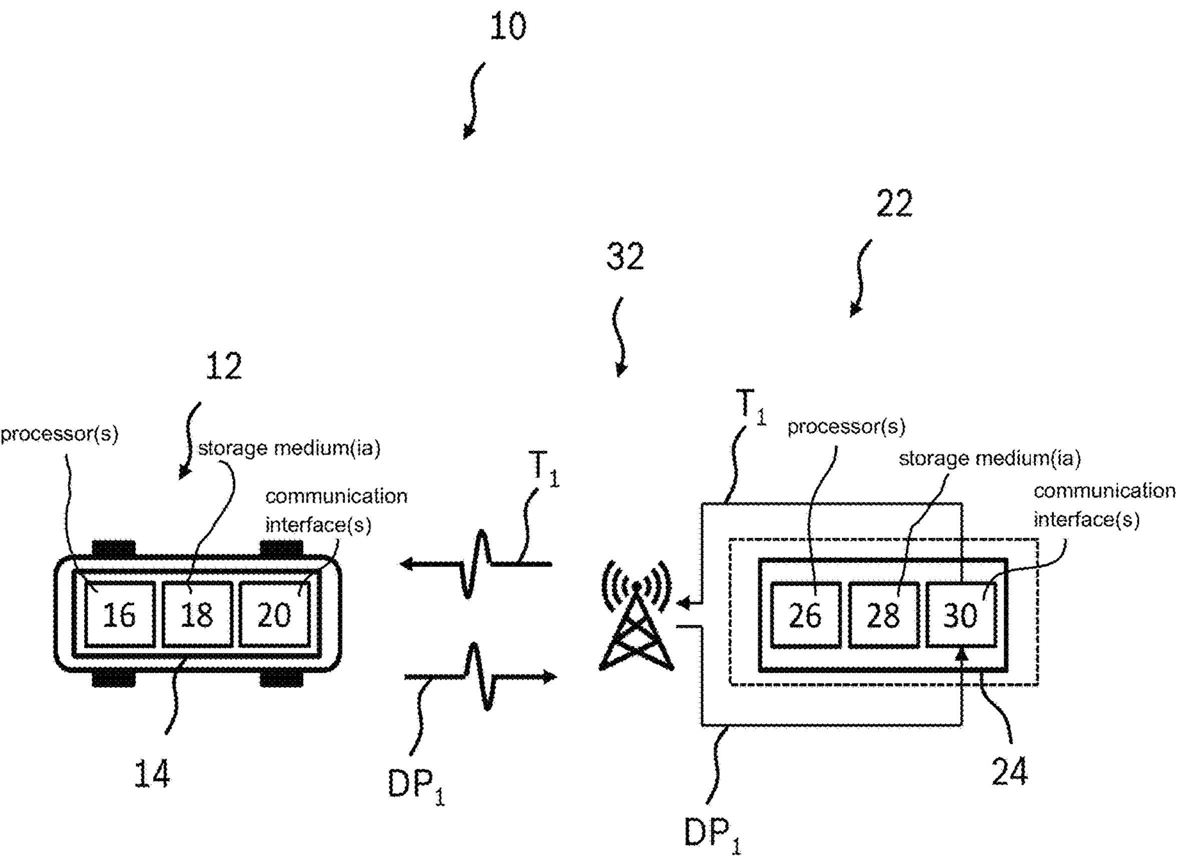
FIG. 1 shows a schematic representation of a communication system, according to an example embodiment of the present invention.

FIG. 1 shows a schematic representation of a communication system 10. The communication system 10 comprises a first communication unit 14 arranged on a vehicle 12 and a second communication unit 24 arranged apart from the vehicle 12. The second communication unit 24 can, for example, be part of a server backend 22.

The first communication unit 14 is connected to the second communication unit 24 by means of a communication network. According to this exemplary embodiment, the communication network comprises a partly wireless and a partly wired communication connection. For example, the first communication unit 14 can be connected by means of a mobile radio connection to a base station, which is connected to the second communication unit 24 by means of a wired connection.

The first communication unit comprises at least one processor 16, at least one storage medium 18 comprising computer program code, and at least one communication interface 20, wherein the computer program code is configured so that it works with the at least one processor 16 and the at least one communication interface 20 so that the first communication unit 14 is operated in accordance with the method according to the first aspect of the present invention.

The second communication unit comprises at least one processor 26, at least one storage medium 28 comprising computer program code, and at least one communication interface 30, wherein the computer program code is configured so that it works with the at least one processor 16 and the at least one communication interface 20 so that the second communication unit 24 is operated in accordance with the method according to the second aspect of the present invention.

The first communication unit 14 is configured to periodically send data packets $DP_1$ with useful data to the second communication unit 24. In so doing, the data packets DP are sent, for example, at a temporal spacing $I_{Data}$. The second communication unit 24 is configured to receive the data packets $DP_1$.

In order to determine the maximum value for the latency time for a received data packet $DP_1$, the second communication unit 24 is configured to periodically send token messages $T_1$ with time information representing a reference time of the particular token message $T_1$ to the first communication unit 14. In so doing, the token messages $T_1$ are sent, for example, at a temporal spacing $I_{token}$. In particular, the token messages $T_1$ are sent even if no data packet $DP_1$ is received, in order to provide the first communication unit 14 with current time information.

According to one embodiment, the first communication unit 14 is configured to add the time information comprised by the token message $T_1$ last received by means of the first communication unit 14 to a data packet $DP_1$ to be sent to the second communication unit 24.

According to an alternative embodiment, the first communication unit 14 is configured to add the time information comprised by the received token messages $T_1$, which represents the most recent reference time, to a data packet $DP_1$ to be sent to the second communication unit 24.

It is possible that the time information comprised by the token messages $T_1$ contains the particular reference time in unencrypted form. The first communication unit 14 is then configured to compare the reference times comprised by the received token messages $T_1$ with each other in order to select the time information representing the most recent reference time and to add it to the data packet $DP_1$ to be sent.

Alternatively, it is possible that the time information comprised by the token messages $T_1$ comprises the particular reference time in encrypted form. Preferably, the token messages $T_1$ then each comprise counter information relating to a sequence number of the particular token message $T_1$. The second communication unit 24 is configured to add counter information to the token message $T_1$, wherein the counter information or the sequence numbers of temporally successive token messages $T_1$ increase monotonically. The first communication unit 14 is then configured to compare the counter information comprised by the received token messages $T_1$ with each other in order to select the counter information representing the highest sequence number and therefore the time information representing the most recent reference time, and to add the time information to the data packet $DP_1$ to be sent.

The second communication unit 24 is configured to receive the data packets $DP_1$ sent by the first communication unit 14, comprising the time information comprised by the particular token message $T_1$.

The second communication unit 24 is furthermore configured to determine one maximum value for the latency time for each of the received data packets $DP_1$ based on the time information comprised by the particular data packet $DP_1$, preferably as a difference between a reception time of the particular data packet $DP_1$ and the reference time represented by the time information.

Figure 2:
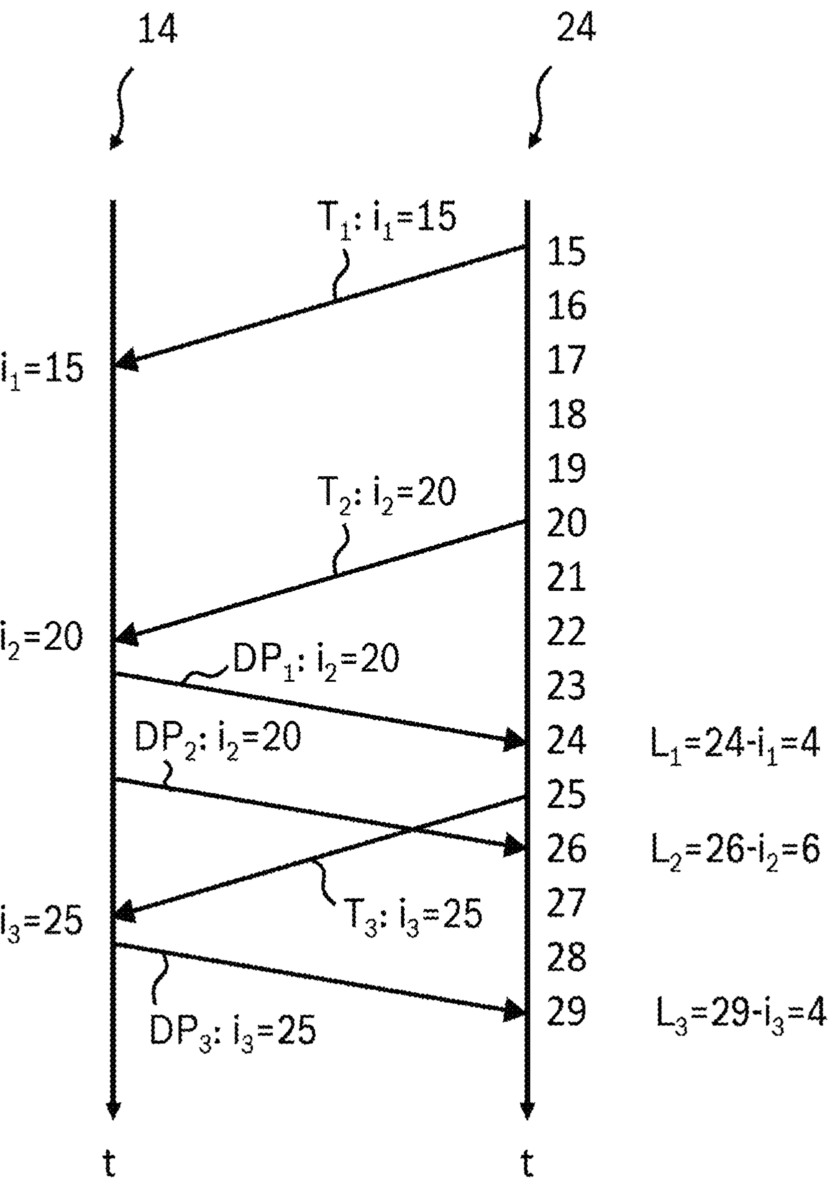
FIG. 2 shows a schematic representation of determining maximum values for latency times of data packets, according to an example embodiment of the present invention.

FIG. 2 shows a schematic representation of determining maximum values $L_1$, $L_2$, $L_3$ for a latency time $t_{lat,1}$, $t_{lat,2}$, $t_{lat,3}$ of data packets $DP_1$, $DP_2$, $DP_3$ which are transmitted from a first communication unit 14 to a second communication unit 16, for example in a communication system 10 according to FIG. 1.

At the point in time t=15, a first token message $T_1$ comprising time information $i_1$ representing a reference time $t_{ref,1}=15$ of the token message $T_1$ is sent to the first communication unit 14 by means of the second communication unit 24.

At the point in time t=17, the first token message $T_1$ is received by the first communication unit 14.

At the point in time t=20, a second token message $T_2$ comprising time information $i_2$ representing the reference time $t_{ref,2}=20$ of the second token message $T_2$ is sent to the first communication unit 14 by means of the second communication unit 24.

At the point in time t=22, the second token message $T_2$ is received by the first communication unit 14. In response to the received second token message $T_2$, the first time information $i_1$ is discarded by the first communication unit 14 and replaced by the second time information $i_2$. That is, in other words, when receiving the second token message $T_2$, the time information $i_1$, which represents the most recent reference time $t_{ref,1}=15$, is replaced by the time information $i_2$, which represents the even more recent reference time $t_{ref,2}=20$, by means of the first communication unit 14.

At the point in time t=23, a first data packet $DP_1$ comprising first useful data and the time information $i_2$ comprised by the second token message $T_2$ is sent to the second communication unit 24 by means of the first communication unit 14.

At the point in time t=24, the first data packet $DP_1$ is received by the second communication unit 24. Based on the time information $i_2$ comprised by the first data packet $DP_1$, a maximum value $L_1$ for the latency time $t_{lat,1}$ of the first data packet $DP_1$ is determined by means of the second communication unit. In so doing, the maximum value $L_1$ for the latency time $t_{lat,1}$ of the first data packet $DP_1$ is determined as the difference between the point in time t=24 of receiving the first data packet $DP_1$ and the reference time $t_{ref,2}$ of the second token message $T_2$ comprised by the first data packet $DP_1$ and represented by the time information $i_2$.

At the point in time t=25, a third token message $T_3$ comprising time information $i_3$ representing the reference time $t_{ref,3}=25$ of the third token message $T_3$ is sent to the first communication unit 14 by means of the second communication unit 24. In response to the received third token message $T_3$, the second time information $i_2$ is discarded by the first communication unit 14 and replaced by the third time information $i_3$.

Furthermore, at the point in time t=25, a second data packet $DP_2$ comprising second useful data and the time information $i_2$ comprised by the second token message $T_2$ is sent to the second communication unit 24 by means of the first communication unit 14.

At the point in time t=26, the second data packet $DP_2$ is received by the second communication unit 24. Based on the time information $i_2$ comprised by the second data packet $DP_2$, a maximum value $L_2$ for the latency time $t_{lat,2}$ of the second data packet $DP_2$ is determined by means of the second communication unit. In so doing, the maximum value $L_2$ for the latency time $t_{lat,2}$ of the second data packet $DP_2$ is determined as the difference between the point in time t=26 of receiving the second data packet $DP_2$ and the reference time $t_{ref,2}$ of the second token message $T_2$ comprised by the second data packet $DP_2$ and represented by the time information $i_2$.

At the point in time t=27, the third token message $T_3$ is received by the first communication unit 14.

At the point in time t=28, a third data packet $DP_3$ comprising third useful data and the time information is comprised by the third token message $T_3$ is sent to the second communication unit 24 by means of the first communication unit 14.

At the point in time t=29, the third data packet $DP_3$ is received by the second communication unit 24. Based on the time information $i_3$ comprised by the third data packet $DP_3$, a maximum value $L_3$ for the latency time $t_{lat,3}$ of the third data packet $DP_3$ is determined by means of the second communication unit. In so doing, the maximum value $L_3$ for the latency time $t_{lat,3}$ of the third data packet $DP_3$ is determined as the difference between the point in time t=29 of receiving the third data packet $DP_3$ and the reference time $t_{ref,3}$ of the third token message $T_3$ comprised by the third data packet $DP_3$ and represented by the time information $i_3$.

In this case, the reference times $t_{ref,1}$, $t_{ref,1}$, $t_{ref,1}$ represent a current system time $t_{ref,1}$, $t_{ref,2}$, $t_{ref,3}$ of the second communication unit 24 at a point in time of generating the particular token message $T_1$, $T_2$, $T_3$.

Figure 3:
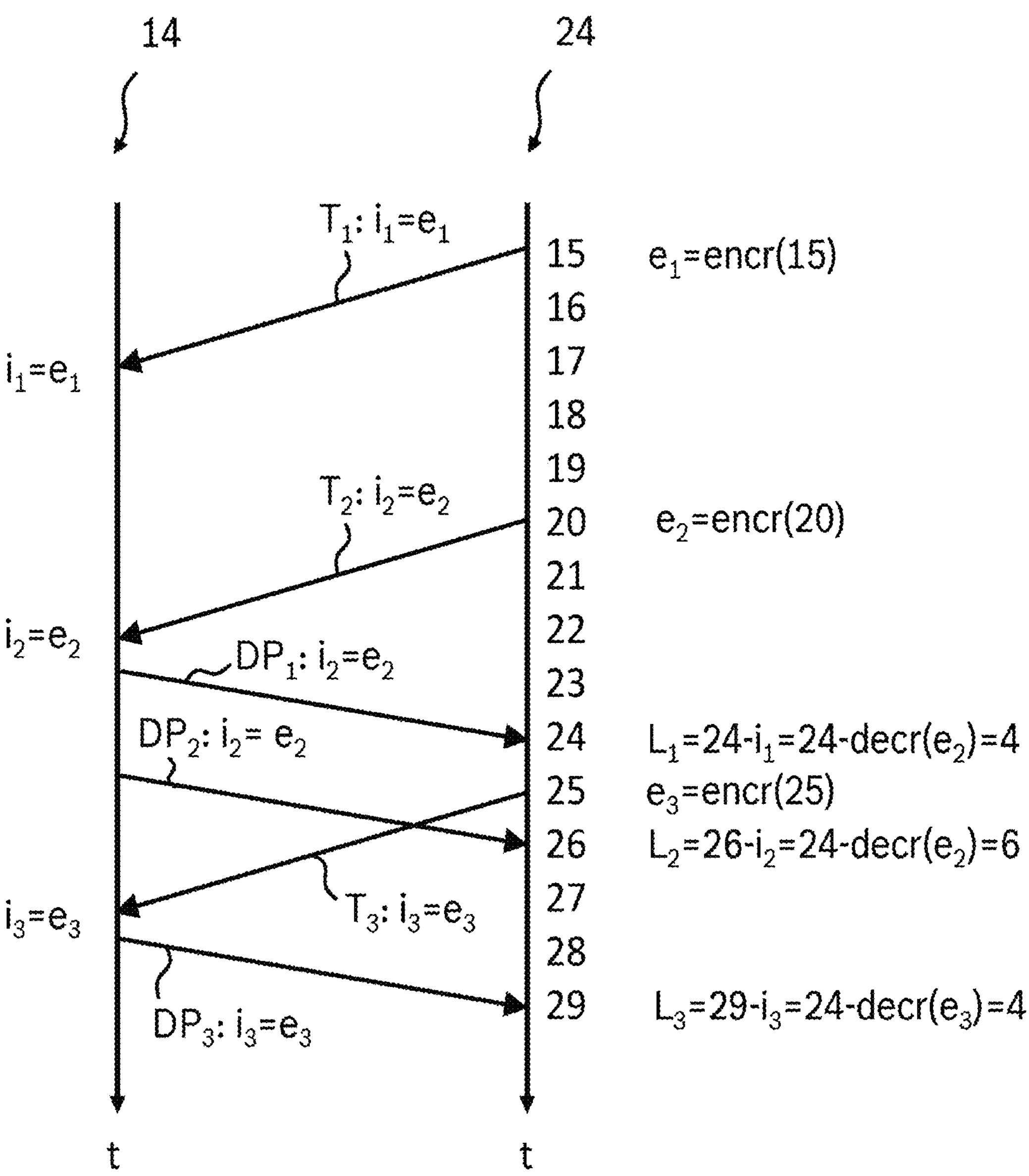
FIG. 3 shows a schematic representation of determining maximum values for latency times of data packets according to an alternative embodiment of the present invention.

FIG. 3 shows a schematic representation of determining maximum values $L_1$, $L_2$, $L_3$ for a latency time $t_{lat,1}$, $t_{lat,2}$, $t_{lat,3}$ of data packets $DP_1$, $DP_2$, $DP_3$ according to an alternative embodiment.

Compared to FIG. 2, the method according to FIG. 3 differs in that the time information $i_1$, $i_2$, $i_3$ comprised by the token messages $T_1$, $T_2$, $T_3$ and representing the reference times $t_{ref,1}$, $t_{ref,2}$, $t_{ref,3}$ of the token messages $T_1$, $T_2$, $T_3$ is encrypted time information $e_1$, $e_2$, $e_3$. In contrast to FIG. 2, the current system time $t_{ref,1}$, $t_{ref,2}$, $t_{ref,3}$ of the second communication unit 24 is not added to the token messages $T_1$, $T_2$, $T_3$ when the particular token message $T_1$, $T_2$, $T_3$ is generated, but rather encrypted time information $i_1=e_1=encr(15)$, $i_2=e_2=encr(20)$, $i_3=e_3=encr(25)$ determined using an encryption function encr. Accordingly, the data packets $DP_1$, $DP_2$, $DP_3$ according to the alternative embodiment comprise the encrypted time information $e_2$, $e_2$, $e_3$.

To determine the maximum values $L_1$, $L_2$, $L_3$ for the latency time $t_{lat,1}$, $t_{lat,2}$, $t_{lat,3}$ of the data packets $DP_1$, $DP_2$, $DP_3$, the encrypted time information $e_2$, $e_2$, $e_3$ of the particular data packet $DP_1$, $DP_2$, $DP_3$ is first decrypted using a decryption function decr in order to determine the reference time $t_{ref,2}$, $t_{ref,2}$, $t_{ref,3}$ comprised in encrypted form by the particular data packet $DP_1$, $DP_2$, $DP_3$. Subsequently, the maximum value $L_1$, $L_2$, $L_3$ for the latency time $t_{lat,1}$, $t_{lat,2}$, $t_{lat,3}$ is determined as the difference between the point in time of receiving the particular data packet $DP_1$, $DP_2$, $DP_3$ and the decrypted reference time $t_{ref,2}$, $t_{ref,2}$, $t_{ref,3}$.

Figure 4:
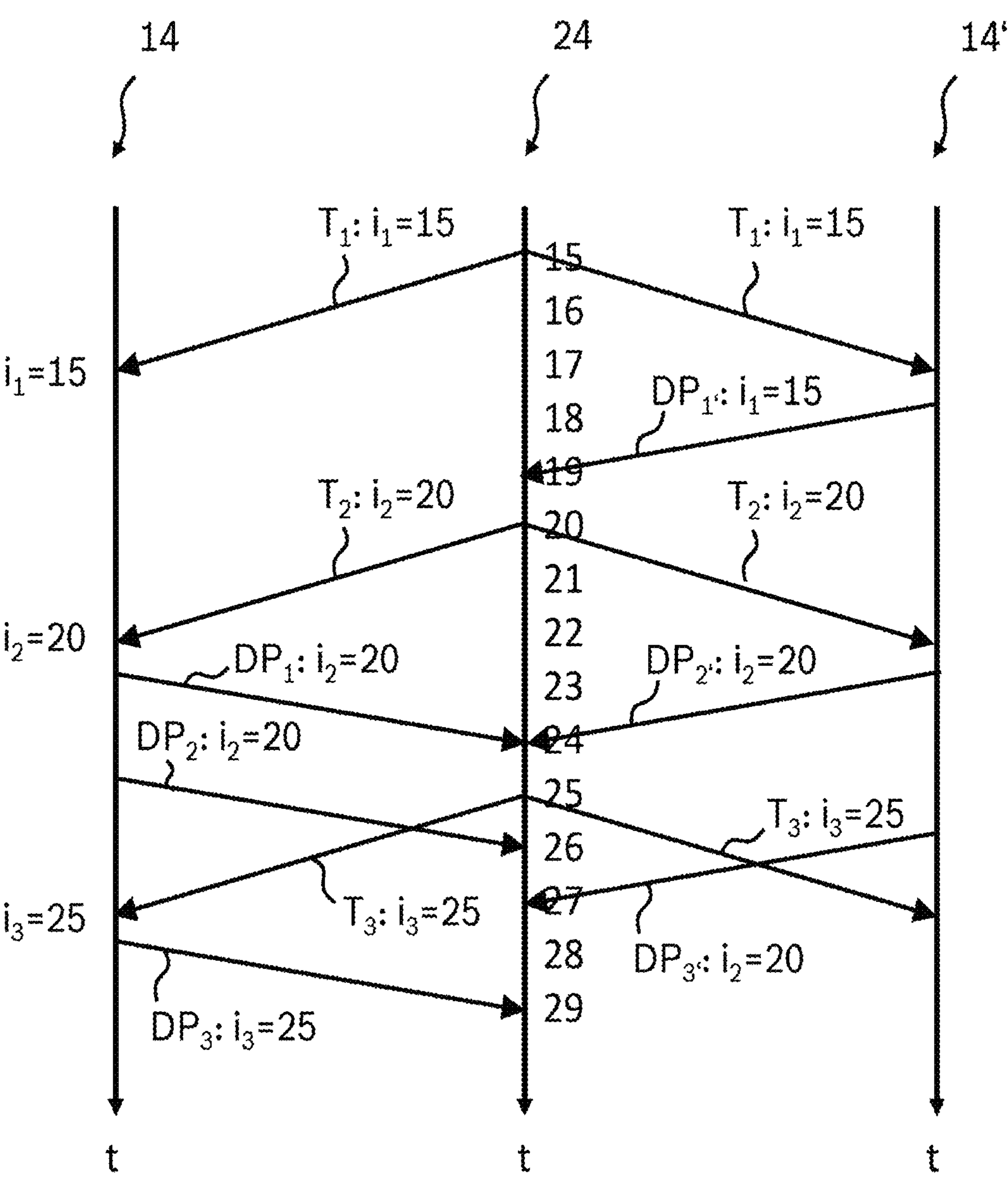
FIG. 4 shows a schematic representation of determining maximum values for latency times of data packets according to another alternative embodiment of the present invention.

FIG. 4 shows a schematic representation of determining maximum $L_1$, $L_2$, $L_3$, $L_1$, $L_2$, $L_3$ for a latency time $t_{lat,1}$, $t_{lat,2}$, $t_{lat,3}$, $t_{lat,1'}$, $t_{lat,2'}$, $t_{lat,3'}$ of data packets $DP_1$, $DP_2$, $DP_3$, $DP_{1'}$, $DP_{2'}$, $DP_3$. according to an alternative embodiment. In this case, in addition to the first communication unit 14 and the second communication unit 24, the communication system comprises an additional first communication unit 14'.

Compared to FIG. 2, the method according to FIG. 4 differs in that the token messages $T_1$, $T_2$, $T_3$ are sent simultaneously to the first communication unit 14 and the additional first communication unit 14' by means of the second communication unit 24.

At the point in time t=17, the first token message $T_1$ is also received by the additional first communication unit 14'.

At the point in time t=18, an additional first data packet $DP_{1'}$ comprising additional first useful data and the time information $i_1$ comprised by the first token message $T_1$ is sent to the second communication unit 24 by means of the additional first communication unit 14'.

At the point in time t=19, the additional first data packet $DP_1$. is received by the second communication unit 24. Based on the time information $i_1$ comprised by the additional first data packet $DP_{1'}$, a maximum value $L_1$ for the latency time $t_{lat,1'}$ of the additional first data packet $DP_{1'}$ is determined by means of the second communication unit. In so doing, the maximum value $L_1$ for the latency time $t_{lat,1'}$ of the additional first data packet $DP_{1'}$ is determined as the difference between the point in time t=19 of receiving the additional first data packet $DP_1$ and the reference time $t_{ref,1}$ of the first token message $T_1$ comprised by the additional first data packet $DP_1$ and represented by the time information $i_1$.

At the point in time t=22, the second token message $T_2$ is received by the additional first communication unit 14. At the point in time t=23, an additional second data packet $DP_{2'}$ comprising additional second useful data and the time information $i_2$ comprised by the second token message $T_2$ is sent to the second communication unit 24 by means of the additional first communication unit 14'.

At the point in time t=24, the additional second data packet $DP_{2'}$ is received by the second communication unit 24. Based on the time information $i_2$ comprised by the additional second data packet $DP_{2'}$, a maximum value $L_{2'}$ for the latency time $t_{lat,2'}$ of the additional second data packet $DP_{2'}$ is determined by means of the second communication unit. In so doing, the maximum value $L_{2'}$ for the latency time $t_{lat,2'}$ of the additional second data packet $DP_{2'}$ is determined as the difference between the point in time t=24 of receiving the additional second data packet $DP_{2'}$ and the reference time $t_{ref,2}$ of the second token message $T_2$ comprised by the additional second data packet $DP_{2'}$ and represented by the time information $i_2$.

At the point in time t=26, an additional third data packet $DP_{3'}$ comprising additional third useful data and the time information $i_2$ comprised by the second token message $T_2$ is sent to the second communication unit 24 by means of the additional first communication unit 14'.

At the point in time t=27, the third token message $T_3$ is received by the additional first communication unit 14'. Furthermore, at the point in time t=27, the additional third data packet $DP_{3'}$ is received by the second communication unit 24. Based on the time information $i_2$ comprised by the additional third data packet $DP_{3'}$, a maximum value $L_{3'}$ for the latency time $t_{lat,3'}$ of the additional third data packet $DP_{3'}$ is determined by means of the second communication unit. In so doing, the maximum value La for the latency time $t_{lat,3'}$ of the additional third data packet $DP_{3'}$ is determined as the difference between the point in time t=27 of receiving the additional third data packet $DP_3$ and the reference time $t_{ref,2}$ of the second token message $T_2$ comprised by the additional third data packet $DP_{3'}$ and represented by the time information $i_2$.

Figures 5A, 5B, 5C:
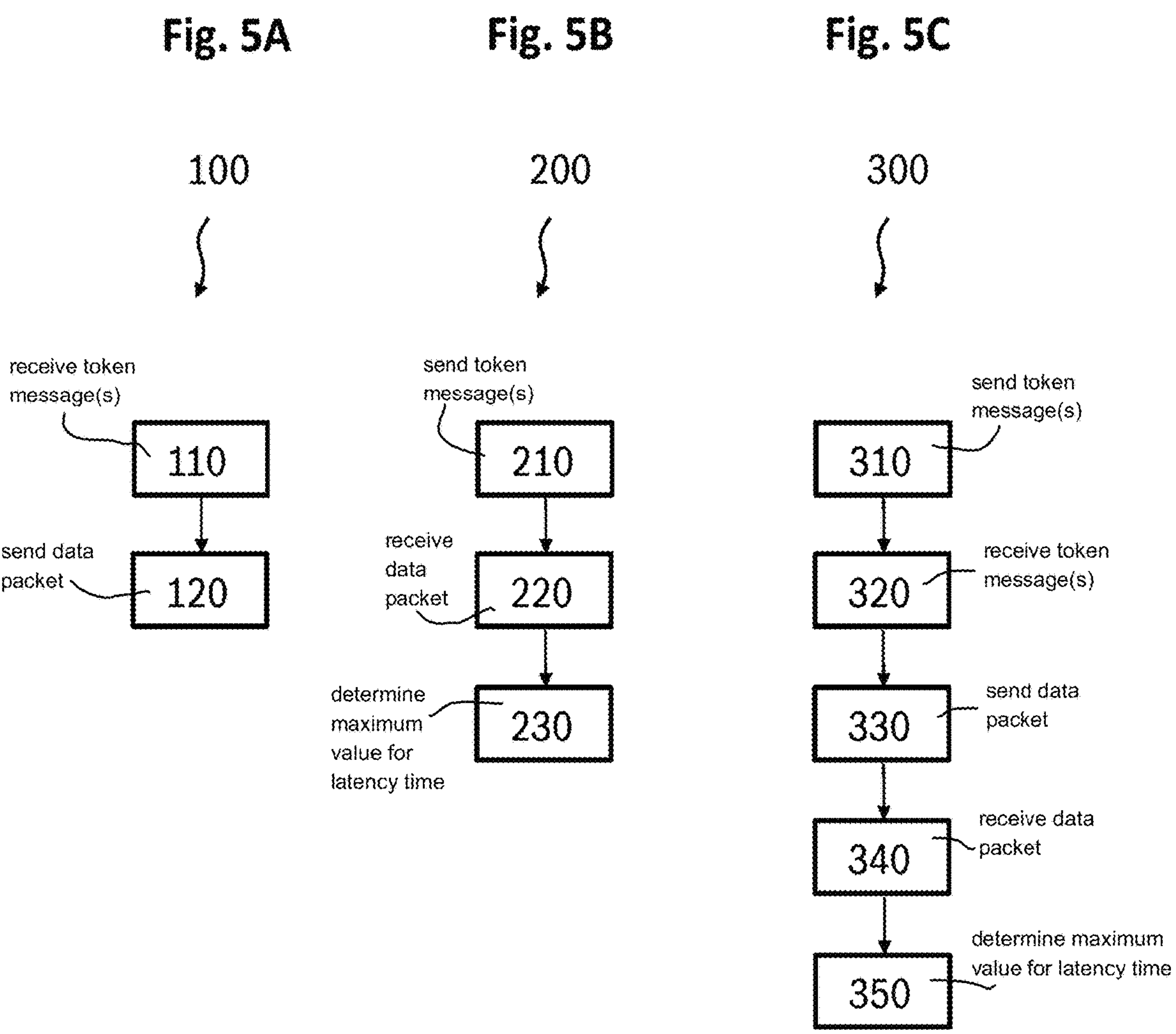
FIGS. 5A, 5B, and 5C each show a flow chart of a method according to example embodiments of the present invention.

FIGS. 5A, 5B, and 5C each show a flow chart of a method according to the present invention.

FIG. 5A shows a flow chart of a method for operating a first communication unit of a communication system in order to determine, by means of a second communication unit, a maximum value for a latency time of a data packet transmitted from the first communication unit to the second communication unit of the communication system. The method in its entirety is provided with the reference sign 100.

In step 110, at least one token message sent from the second communication unit to the first communication unit, comprising time information representing a reference time of the token message, is received by means of the first communication unit. In step 120, a data packet with the time information comprised by the at least one received token message is sent to the second communication unit by means of the first communication unit in order to determine, by means of the second communication unit, the maximum value for the latency time of the data packet transmitted from the first communication unit to the second communication unit based on the time information comprised by the data packet.

FIG. 5B shows a flow chart of a method for operating a second communication unit of a communication system in order to determine, by means of the second communication unit, a maximum value for a latency time of a data packet transmitted from a first communication unit of the communication system to the second communication unit. The method in its entirety is provided with the reference sign 200.

In step 210, at least one token message comprising time information representing a reference time of the token message is sent to the first communication unit by means of the first communication unit.

In step 220, the data packet transmitted from the first communication unit to the second communication unit with the time information comprised by the at least one sent token message is received by the second communication unit.

In step 230, by means of the second communication unit, the maximum value for the latency time of the data packet transmitted from the first communication unit to the second communication unit is determined based on the time information comprised by the data packet.

FIG. 5C shows a flow chart of a method for operating a communication system comprising a first communication unit and a second communication unit in order to determine, by means of the second communication unit, a maximum value for a latency time of a data packet transmitted from the first communication unit to the second communication unit. The method in its entirety is provided with the reference sign 300.

In step 310, at least one token message comprising time information representing a reference time of the token message is sent to the first communication unit by means of the first communication unit.

In step 320, the at least one token message sent from the second communication unit to the first communication unit, comprising time information representing a reference time of the token message, is received by means of the first communication unit.

In step 330, a data packet with the time information comprised by the at least one received token message is sent to the second communication unit by means of the first communication unit.

In step 340, the data packet transmitted from the first communication unit to the second communication unit with the time information comprised by the at least one sent token message is received by the second communication unit.

In step 350, by means of the second communication unit, the maximum value for the latency time of the data packet transmitted from the first communication unit to the second communication unit is determined based on the time information comprised by the data packet.

The invention claimed is:

1. A method for operating a first communication unit of a communication system in order to determine, using a second communication unit, a maximum value for a latency time of a data packet transmitted from the first communication unit to the second communication unit of the communication system, each of the first and second communication units including a respective processing system that includes at least one processor and including a respective communication interface via which communication between the first and second communication units is enabled, and the second communication unit further including a clock, the method comprising the following steps:

receiving, by the first communication unit via the communication interface of the first communication unit, at least one token message sent from the second communication unit to the first communication unit, the token message including time information representing a reference time of the token message, which is based on the clock of the second communication unit;

locally recording, by the processing system of the first communication unit, the reference time represented by the time information included in the at least one received token message; and after a delay since receipt of the at least one token message and upon the first communication unit reaching, independently of the receipt of the at least one token message, a state in which the first communication unit has data to be transmitted to the second communication unit, sending, by the processing system of the first communication unit and using the communication interface of the first communication unit, the data packet including the data to the second communication unit, wherein the data packet further includes an identification of the locally recorded reference time, in order to determine, using the second communication unit, the maximum value for the latency time of the data packet transmitted from the first communication unit to the second communication unit, based on the identification of the locally recorded reference time included in the data packet.

2. A method for operating a first communication unit of a communication system in order to determine, using a second communication unit, a maximum value for a latency time of a data packet transmitted from the first communication unit to the second communication unit of the communication system, each of the first and second communication units including a respective processing system that includes at least one processor and including a respective communication interface via which communication between the first and second communication units is enabled, and the second communication unit further including a clock, the method comprising:

receiving over time, by the first communication unit, via the communication interface of the first communication unit, from the second communication unit, and without data packet transmissions from the first communication unit to the second communication unit, a plurality of token messages that each includes respective time information representing a respective reference time of the respective token message generated by the second communication unit based on a respective clock value of the clock that is extant when the respective token message is generated; and subsequent to the receipt of the plurality of token messages, transmitting, by processing system of the first communication unit and using the communication interface of the first communication unit, the data packet with the respective time information included in one of the plurality of token messages to the second communication unit in order to determine, using the second communication unit, the maximum value for the latency time of the data packet transmitted from the first communication unit to the second communication unit, based on the time information included in the data packet, wherein the time information included in the data packet is:

whichever of the time information that had been included in a last one of the token messages that the first communication unit had received from the second communication unit; or whichever of the time information that represents a most recent one of the reference times.

3. The method according to claim 2, wherein the token messages each includes counter information comprised by the respective time information, wherein the time information included in the data packet is selected based on the counter information.

4. A method for operating a second communication unit of a communication system in order to determine, by the second communication unit, a maximum value for a latency time of a data packet transmitted from a first communication unit of the communication system to the second communication unit, each of the first and second communication units including a respective processing system that includes at least one processor and including a respective communication interface via which communication between the first and second communication units is enabled, and the second communication unit further including a clock, the method comprising the following steps:

sending, to the first communication unit and by the processing system of the second communication unit using the communication interface of the second communication unit, at least one token message including time information representing a reference time of the token message, which is based on the clock of the second communication unit, wherein the first communication unit, to which the second communication unit sends the at least one token message, is configured to locally record the reference time represented by the time information included in the at least one token message;

receiving, by the second communication unit and from the first communication unit, a data packet that is transmitted by the first communication unit to the second communication unit after a delay since receipt by the first communication unit of the at least one token message and upon the first communication unit reaching, independently of the receipt of the at least one token message, a state in which the first communication unit has data to be transmitted to the second communication unit, wherein the data packet includes the data and further includes an identification of the reference time that the first communication unit had locally stored; and determining, by the processing system of the second communication unit, the maximum value for the latency time of the data packet transmitted from the first communication unit to the second communication unit, based on the identified reference time included in the data packet.

5. The method according to claim 4, wherein the maximum value for the latency time is also determined based on a reception time of the data packet received by the second communication unit, and wherein the maximum value for the latency time is determined as the difference between the reception time and the reference time represented by the time information.

6. The method according to claim 4, wherein the at least one token message includes a plurality of token messages, each including respective time information representing a respective reference time of the respective token message, and wherein the plurality of token messages are sent at intervals in time periodically to the first communication unit by the second communication unit.

7. The method according to claim 6, wherein a periodicity of the intervals in time is determined or specified depending on one or more variables from a group of variables that consists of:

a fault-tolerant time interval, a probability of exceeding the fault-tolerant time interval, a loss probability for a loss of token messages and/or data packets, a transmission period of the token message, a transmission period of the data packet, and a temporal spacing or periodicity of the data packets.

8. The method according to claim 6, wherein a temporal spacing of the token messages that are sent are spaced apart in time according to an exponential smoothing algorithm.

9. The method according to claim 4, wherein the token message includes counter information comprised by the time information, wherein a number of bits representing the counter information is determined or specified depending on one or more variables of a group consisting of the following variables:

temporal spacing or periodicity of the token messages, temporal spacing or periodicity of the data packets, and maximum possible latency time of a data packet received by means of the second communication unit.

10. A method for operating a communication system including a first communication unit and a second communication unit in order to determine, using the second communication unit, a maximum value of a latency time of a data packet transmitted from the first communication unit to the second communication unit, each of the first and second communication units including a respective processing system that includes at least one processor and including a respective communication interface via which communication between the first and second communication units is enabled, and the second communication unit further including a clock, the method comprising the following steps:

sending to the first communication unit by the processing system of the second communication unit using the communication interface of the second communication unit, at least one token message including time information representing a reference time of the token message, which is based on the clock of the second communication unit;

receiving, by the first communication unit via the communication interface of the first communication unit, the at least one token message sent from the second communication unit to the first communication unit;

locally recording, by the processing system of the first communication unit, the reference time represented by the time information included in the at least one received token message;

after a delay since receipt of the at least one token message and upon the first communication unit reaching, independently of the receipt of the at least one token message, a state in which the first communication unit has data to be transmitted to the second communication unit, sending, by the processing system of the first communication unit using the communication interface of the first communication unit, the data packet including the data to the second communication unit, wherein the data packet further includes an identification of the locally recorded reference time;

receiving, by the second communication unit via the communication interface of the second communication unit, the data packet transmitted from the first communication unit to the second communication unit; and determining, by the processing system of the second communication unit, the maximum value for the latency time of the data packet transmitted from the first communication unit to the second communication unit, based on the identified reference time included in the data packet.

11. A first communication unit of a communication system that further includes a second communication unit, the second communication unit of the communication system including a second processing system that includes at least one processor, a second communication interface, and a clock, the first communication unit comprising:

a first processing system that includes at least one processor; and a first communication interface;

wherein the first processing system is configured to:

receive, via the first communication interface, at least one token message sent by the second processing system of the second communication unit using the second communication interface to the first communication unit, the token message including time information representing a reference time of the token message, which is based on the clock of the second communication unit;

locally record the reference time represented by the time information included in the at least one received token message; and after a delay since receipt of the at least one token message and upon the first communication unit reaching, independently of the receipt of the at least one token message, a state in which the first communication unit has data to be transmitted to the second communication unit, send, via the first communication interface, a data packet including the data to the second communication unit, wherein the data packet further includes an identification of the locally recorded reference time, in order to determine, using the second communication unit, a maximum value for a latency time of the data packet transmitted from the first communication unit to the second communication unit based on the identification of the locally recorded reference time included in the data packet.

12. A second communication unit of a communication system that further includes a first communication unit, the first communication unit of the communication system including a first processing system that includes at least one processor and a first communication interface, the second communication unit comprising:

a second processing system that includes at least one processor;

a second communication interface; and a clock;

wherein the second processing system is configured to:

send, using the second communication interface, at least one token message including time information representing a reference time of the token message, which is based on the clock of the second communication unit, to a first communication unit of a communication system, the communication system including the first communication unit and the second communication unit, wherein the first processing system of the first communication unit, to which the second communication unit sends the at least one token message, is configured to locally record the reference time represented by the time information included in the at least one token message;

receive, via the second communication interface and from the first communication unit, a data packet that is transmitted by the first communication unit to the second communication unit after a delay since receipt by the first communication unit of the at least one token message and upon the first communication unit reaching, independently of the receipt of the at least one token message, a state in which the first communication unit has data to be transmitted to the second communication unit, wherein the data packet includes the data and further includes an identification of the reference time that the first communication unit had locally stored; and determine a maximum value for a latency time of the data packet transmitted from the first communication unit to the second communication unit based on the identified reference time included in the data packet.

13. A communication system, comprising:

a first communication unit that includes first communication interface and a first processing system having at least one processor; and a second communication unit including a second communication interface, a clock, and a second processing system that includes at least one processor;

wherein:

the second processing system of the second communication unit is configured to send, using the second communication interface and to the first communication unit, at least one token message including time information representing a reference time of the token message, which is based on the clock of the second communication unit;

the first processing system of the first communication unit is configured to:

receive, via the first communication interface, the at least one token message sent from the second communication unit to the first communication unit;

locally record the reference time represented by the time information included in the at least one received token message; and after a delay since receipt of the at least one token message and upon the first communication unit reaching, independently of the receipt of the at least one token message, a state in which the first communication unit has data to be transmitted to the second communication unit, transmit, using the communication interface, a data packet including the data to the second communication unit, wherein the data packet further includes an identification of the locally recorded reference time; and the second processing system of the second communication unit is configured to:

receive, via the second communication interface, the data packet transmitted from the first communication unit to the second communication unit, and determine a maximum value for a latency time of the data packet transmitted from the first communication unit to the second communication unit based on the identified reference time included in the data packet.

14. A non-transitory machine-readable storage medium on which is stored a computer program for operating a first communication unit of a communication system in order to determine, using a second communication unit, a maximum value for a latency time of a data packet transmitted from the first communication unit to the second communication unit of the communication system, each of the first and second communication units including a respective processing system that includes at least one processor and including a respective communication interface via which communication between the first and second communication units is enabled, and the second communication unit further including a clock, the computer program, when executed by the processing system of the first communication unit, causing the processing system of the first communication unit to perform the following steps:

receiving, by the first communication unit and via the communication interface of the first communication unit, at least one token message sent from the second communication unit to the first communication unit, the token message including time information representing a reference time of the token message, which is based on the clock of the second communication unit;

locally recording, by the first communication unit, the reference time represented by the time information included in the at least one received token message; and after a delay since receipt of the at least one token message and upon the first communication unit reaching, independently of the receipt of the at least one token message, a state in which the first communication unit has data to be transmitted to the second communication unit, sending, by the first communication unit and using the communication interface of the first communication unit, the data packet including the data to the second communication unit, wherein the data packet further includes an identification of the locally recorded reference time, in order to determine, using the second communication unit, the maximum value for the latency time of the data packet transmitted from the first communication unit to the second communication unit, based on the identification of the locally recorded reference time included in the data packet.

* * * * *